(12) United States Patent  (10) Patent No.: US 8,484,595 B2
Sakamoto  (45) Date of Patent: Jul. 9, 2013

(54) SEMICONDUCTOR INTEGRATED CIRCUIT DEVICE, DESIGN METHOD, DESIGN APPARATUS, AND PROGRAM

(75) Inventor: Hideo Sakamoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 205 days.

(21) Appl. No.: 13/032,379

(22) Filed: Feb. 22, 2011

(65) Prior Publication Data

US 2011/0204358 A1   Aug. 25, 2011

(30) Foreign Application Priority Data

Feb. 24, 2010  (JP) ................................. 2010-038973

(51) Int. Cl.
*G06F 17/50*  (2006.01)
*H01L 23/50*  (2006.01)

(52) U.S. Cl.
USPC ........... 716/111; 716/100; 716/112; 716/118; 716/119; 257/48

(58) Field of Classification Search
USPC ............. 716/100, 112, 118, 119, 111; 257/48
See application file for complete search history.

(56) References Cited

U.S. PATENT DOCUMENTS

| 4,651,190 | A | * | 3/1987 | Suzuki et al. | 257/206 |
|---|---|---|---|---|---|
| 5,744,838 | A | * | 4/1998 | Matsuo et al. | 257/356 |
| 6,075,292 | A | * | 6/2000 | Noguchi | 257/758 |
| 6,407,429 | B1 | * | 6/2002 | Ko et al. | 257/350 |
| 6,421,816 | B1 | * | 7/2002 | Ishikura | 257/355 |
| 6,496,959 | B1 | * | 12/2002 | Noguchi | 716/51 |
| 6,550,039 | B2 | * | 4/2003 | Noguchi | 716/115 |
| 6,765,265 | B2 | * | 7/2004 | Yudasaka et al. | 257/347 |
| 6,815,771 | B2 | * | 11/2004 | Kimura | 257/347 |
| 6,862,723 | B1 | * | 3/2005 | Wang et al. | 716/112 |
| 7,174,527 | B2 | * | 2/2007 | Itou et al. | 716/52 |
| 7,194,725 | B1 | * | 3/2007 | Lukanc et al. | 716/52 |
| 7,523,419 | B2 | | 4/2009 | Furuki | |

FOREIGN PATENT DOCUMENTS

JP    2006-128498 A    5/2006
JP    2006-140349 A    6/2006

* cited by examiner

*Primary Examiner* — Sun Lin
(74) *Attorney, Agent, or Firm* — Foley & Lardner LLP (57) ABSTRACT

An antenna ratio calculation section extracts components from which two or more independent metal wires are coupled to one of diffusion layer regions based on layout data read from a layout data accumulation section, determines, for each of the components, the area of each of the two or more independent metal wires and electrodes coupled to the respective metal wires, determines an antenna ratio between the area of each of the metal wires and the area of the electrode coupled to the metal wire, and determines a moderation value for moderating a design standard associated with plasma charge damage related to one of the metal wires based on the ratio of the total area of all the metal wires coupled to the one of the diffusion layer regions to the area of the one of the metal wires.

18 Claims, 8 Drawing Sheets

| ANTENNA RATIO (A/R) | GATE AREA [$\mu m^2$] | WIRING AREA [$\mu m^2$] | DIFFUSION LAYER AREA [$\mu m^2$] | NUMBER OF ANTENNA NODES COUPLED TO DIFFUSION LAYER |
|---|---|---|---|---|
| 100 | 0.1 | 10*ai | 0.1 | N |
| 300 | 0.1 | 30*ai | 0.1 | N |
| 1000 | 0.1 | 100*ai | 0.1 | N |
| 3000 | 0.1 | 300*ai | 0.1 | N |
| 10000 | 0.1 | 1000*ai | 0.1 | N |
| 100 | 0.1 | 10*ai | 0.3 | N |
| 300 | 0.1 | 30*ai | 0.3 | N |
| 1000 | 0.1 | 100*ai | 0.3 | N |
| 3000 | 0.1 | 300*ai | 0.3 | N |
| 10000 | 0.1 | 1000*ai | 0.3 | N |
| 100 | 0.1 | 10*ai | 1 | N |
| 300 | 0.1 | 30*ai | 1 | N |
| 1000 | 0.1 | 100*ai | 1 | N |
| 3000 | 0.1 | 300*ai | 1 | N |
| 10000 | 0.1 | 1000*ai | 1 | N |
| 100 | 0.1 | 10*ai | 3 | N |
| 300 | 0.1 | 30*ai | 3 | N |
| 1000 | 0.1 | 100*ai | 3 | N |
| 3000 | 0.1 | 300*ai | 3 | N |
| 10000 | 0.1 | 1000*ai | 3 | N |
| 100 | 0.1 | 10*ai | 10 | N |
| 300 | 0.1 | 30*ai | 10 | N |
| 1000 | 0.1 | 100*ai | 10 | N |
| 3000 | 0.1 | 300*ai | 10 | N |
| 10000 | 0.1 | 1000*ai | 10 | N |

SEMICONDUCTOR INTEGRATED CIRCUIT DEVICE, DESIGN METHOD, DESIGN APPARATUS, AND PROGRAM

CROSS-REFERENCE TO RELATED APPLICATIONS

The disclosure of Japanese Patent Application No. 2010-38973 filed on Feb. 24, 2010 including the specification, drawings and abstract is incorporated herein by reference in its entirety.

BACKGROUND

1. Field of the Invention

The present invention relates to a semiconductor integrated circuit device, a design method, a design apparatus, and a program, and particularly to a technology for designing a semiconductor integrated circuit device so as to prevent breakdown or degradation due to a charge-up phenomenon in manufacturing steps thereof.

2. Description of the Related Art

In manufacturing steps of a semiconductor integrated circuit, a plasma or ion beam technique is used. In such steps, when wiring of the semiconductor integrated circuit is coupled to a gate electrode, charges are accumulated in the wiring. If the accumulated charges exceed a given amount, the breakdown or degradation of a gate oxide film is caused thereby, or the performance of a transistor is degraded thereby. Such a phenomenon is called an antenna effect.

To prevent damage to the gate oxide film due to charge-up resulting from the antenna effect, it is commonly practiced during the design of the semiconductor integrated circuit to limit, in accordance with the area or capacitance of the gate, the area of wiring directly coupled to the gate or the perimeter thereof reduced to the area, and thereby take anti-charge-up measures.

As a semiconductor device process has been increasingly miniaturized, the influence of not only the area of wiring but also a layout in the vicinity of the wiring increases to make it difficult to obtain a semiconductor integrated circuit which is sufficiently stable against the antenna effect. This causes the need to perform design with a certain degree of allowance for an antenna ratio, which is a ratio between the area of the wiring and the area of a gate electrode. As a result, the area of wiring directly coupled to the gate is limited more than necessary. In other words, this results in frequent use of the insertion of a repeater cell or a diode cell in the wiring, the adjustment of the size of a transistor to achieve a wiring/gate area of not less than a predetermined value in an uppermost wiring layer, the use of a cell to which a new transistor is added, or the like to increase cases where a chip size cannot be sufficiently reduced.

A technique is disclosed in Japanese Application Publication No. 2006-128498 which also considers, as an example of such influence of a layout in the vicinity of wiring, the influence of charge-up via an inter-line capacitance between wires adjacent to the wiring directly coupled to the gate or the like, and designs/manufactures a semiconductor integrated circuit device.

In Japanese Application Publication No. 2006-140349, a design method is disclosed in which an antenna value, which is an estimated value of damage to a transistor gate, is outputted based on an antenna ratio and a variation rate of plasma charging damage due to a layout in the vicinity of the transistor gate. More specifically, it is described that, in an antenna value calculation step, the antenna value is calculated based on the antenna ratio in consideration of the effect of reducing an antenna effect depending on whether a diffusion layer coupled to the other terminal of wiring directly coupled to the transistor gate forms a diode or a substrate contact. It is further described that the antenna value calculation step includes the step of calculating the antenna value by considering a variation component based on the effect of reducing the antenna effect, which is in accordance with the area of the diffusion layer coupled to the transistor gate via the wiring against the antenna effect and so forth.

SUMMARY

The following analysis is given in the present invention.

Figure 8:
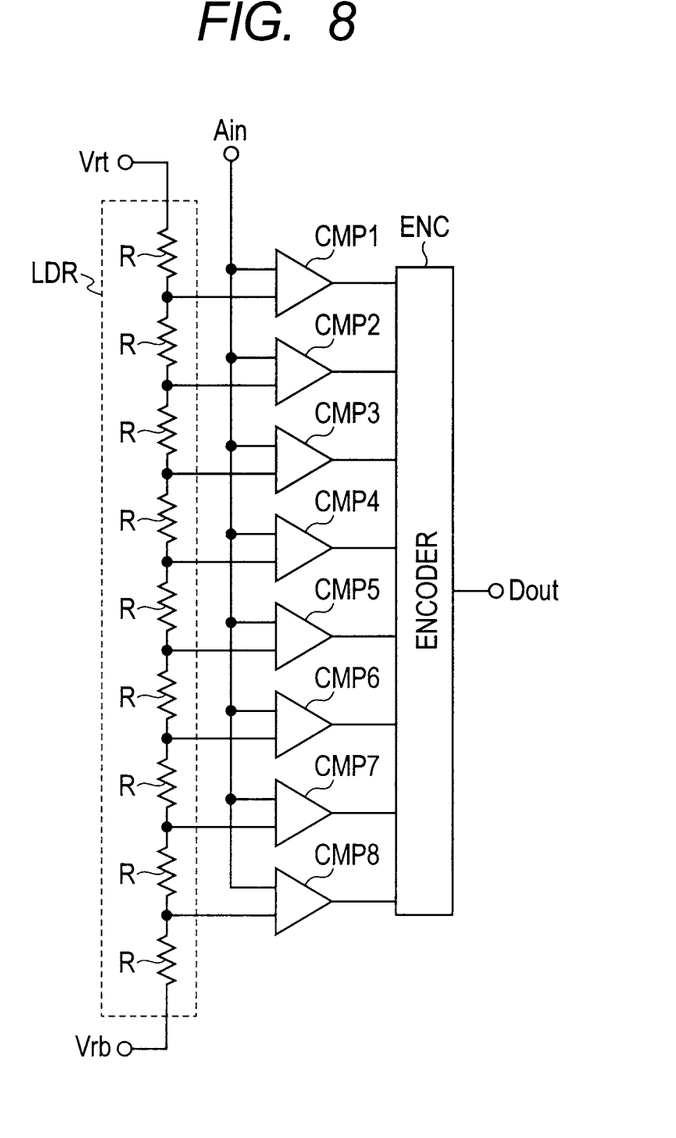
FIG. 8 shows an example of a circuit diagram of a semiconductor integrated circuit device in which a diffusion layer is used as a resistive element.

There is a case where a diffusion layer coupled to the other terminal of a metal wire directly coupled to a transistor gate is used as a resistive element or wiring. FIG. 8 shows an example of a circuit diagram of a semiconductor integrated circuit device in which a diffusion layer is used as a resistive element. In FIG. 8, the semiconductor integrated circuit device includes a ladder resistor LDR, comparators CMP1 to CMP8, and an encoder ENC to form an AD converter. The ladder resistor LDR is formed of a diffusion layer, and has both terminals thereof coupled to respective power supplies Vrt and Vrb to couple wires to respective one comparison input terminals of the comparators CMP1 to CMP8 via respective contact plugs equidistantly arranged in the diffusion layer. To the other comparison input terminals of the comparators CMP1 to CMP8, an analog signal Ain is commonly inputted. The encoder ENC encodes and converts a thermometer code, which is a comparison result output of each of the comparators CMP1 to CMP8, into a digital signal Dout serving as a binary code, and outputs the digital signal Dout representing the result of AD conversion of the analog signal Ain. Here, the respective comparison input terminals of the comparators CMP1 to CMP8 are typically coupled to the gates of transistors forming the comparators.

In the semiconductor integrated circuit device having a configuration as described above, the wires coupled to the respective one comparison input terminals have one terminals thereof coupled to the transistor gates and the other terminals thereof coupled to the diffusion layer serving as the ladder resistor LDR. As a result, the antenna effect of the wiring that occurs during manufacturing is reduced by the diffusion layer serving as the ladder resistor LDR.

Figure 9A:
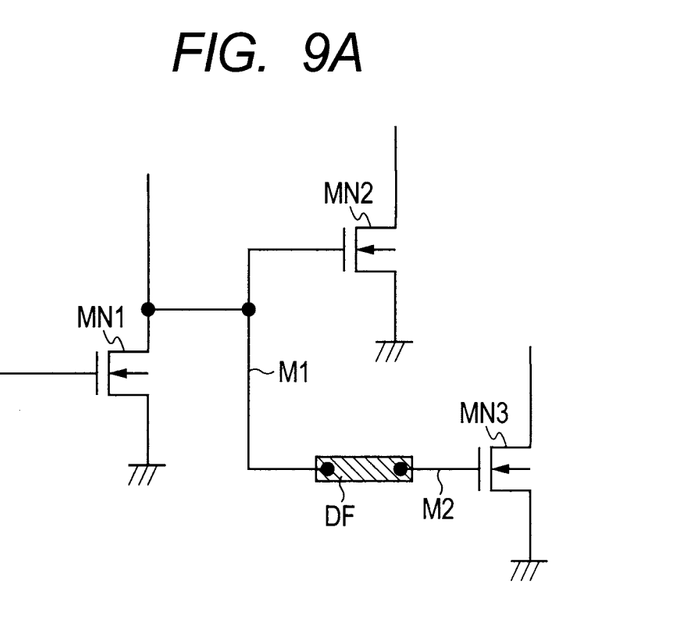
FIGS. 9A and 9B show examples of a circuit diagram of a semiconductor integrated circuit device in which a diffusion layer is used as wiring and a cross-sectional view thereof.
Figure 9B:
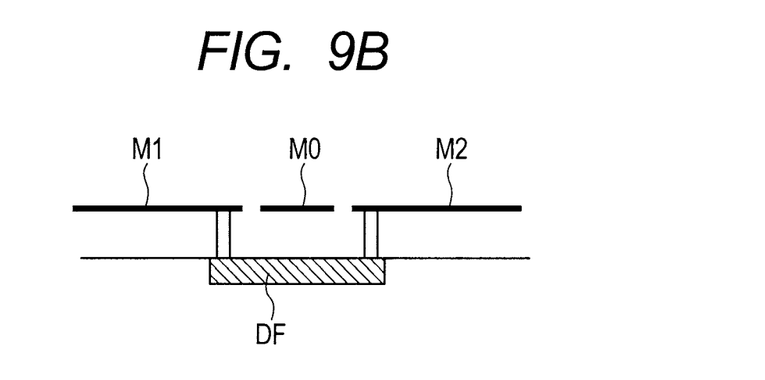

FIGS. 9A and 9B show examples of a circuit diagram of a semiconductor integrated circuit device in which a diffusion layer is used as wiring and a cross-sectional view thereof. In FIG. 9A, the semiconductor integrated circuit device includes NMOS transistors MN1, MN2, and MN3, metal wires M1 and M2, and a diffusion layer DF. The NMOS transistor MN1 has a grounded source and a drain coupled to the gate of the NMOS transistor MN2 via the metal wire M1. The NMOS transistor MN1 also has the drain coupled to the gate of the NMOS transistor MN3 via the metal wire M1, the diffusion layer DF, and the metal wire M2. As shown in the cross-sectional view of FIG. 9B, when a layout is such that, e.g., the presence of a metal wire M0 prevents the metal wires M1 and M2 from being directly coupled to each other, the diffusion layer DF functions to bypass the metal wires M1 and M2 over a substrate, and electrically couple the metal wires M1 and M2. Such wiring serving as a bypass provided by the diffusion layer DF may be occasionally used under layout restrictions when the circuit of the semiconductor integrated circuit device is laid out.

In the semiconductor integrated circuit device having a configuration as described above, the metal wire M1 has one terminal thereof coupled to the gate of the NMOS transistor MN2, another terminal thereof coupled to the diffusion layer DF, and still another terminal thereof coupled to the drain (diffusion layer) of the NMOS transistor MN1. As a result, the antenna effect of the metal wire M1 that occurs during manufacturing is reduced by the diffusion layer DF and the drain of the NMOS transistor MN1.

On the other hand, the metal wire M2 has one terminal thereof coupled to the gate of the NMOS transistor MN3, and the other terminal thereof coupled to the diffusion layer DF. As a result, the antenna effect of the metal wire M2 that occurs during manufacturing is reduced by the diffusion layer DF.

In the prior art technology, even when consideration is given to a variation component based on the effect of reducing the antenna effect, it is not disclosed how the consideration should be given with regard to a semiconductor integrated circuit device having an exemplary configuration as described above in which two or more independent metal wires are coupled to one of diffusion layers, and proper design cannot be performed. As a result, design with sufficient allowance should be performed, and the area of the semiconductor integrated circuit device cannot be reduced for a circuit as a design target.

The present inventors have found that, when charge-up is to be reduced using a conventional diffusion layer coupled to the other terminal of a wire directly coupled to a transistor gate, a semiconductor integrated circuit device should be designed by also considering the influence of the charge-up of another wire coupled to the diffusion layer, and achieved the present invention.

A design method according to an aspect of the present invention is a method by which a design apparatus designs a layout in a semiconductor integrated circuit device including electrodes each disposed over a substrate via an insulating film, metal wires in an outermost surface coupled to the electrodes, and diffusion layer regions in the substrate coupled to the metal wires, the design method including the steps of: extracting, based on layout data of the semiconductor integrated circuit device, components from which the two or more independent metal wires are coupled to one of the diffusion layer regions; determining an area of each of the two or more independent metal wires and an area of each of the electrodes coupled to the respective metal wires; determining an antenna ratio between the area of each of the metal wires and the area of the electrode coupled to the metal wire; determining a moderation value for moderating a design standard associated with plasma charge damage related to one of the metal wires based on a ratio of a total area of all the metal wires coupled to the one of the diffusion layer regions to an area of the one of the metal wires; and verifying the antenna ratio corresponding to the one of the metal wires based on the design standard moderated with the moderation value related to the one of the metal wires.

A design apparatus according to another aspect of the present invention is a design apparatus for performing design of a layout in a semiconductor integrated circuit device including electrodes each disposed over a substrate via an insulating film, metal wires in an outermost surface coupled to the electrodes, and diffusion layer regions in the substrate coupled to the metal wires, the design apparatus including: a layout data accumulation section for holding layout data of the semiconductor integrated circuit device; an antenna ratio calculation section for reading the layout data from the layout data accumulation section, extracting, based on the layout data, components from which the two or more independent metal wires are coupled to one of the diffusion layer regions, determining, for each of the components, an area of each of the two or more independent metal wires and an area of each of the electrodes coupled to the respective metal wires, determining an antenna ratio between the area of each of the metal wires and the area of the electrode coupled to the metal wire, and determining a moderation value for moderating a design standard associated with plasma charge damage related to one of the metal wires based on a ratio of a total area of all the metal wires coupled to the one of the diffusion layer regions to an area of one of the metal wires; and a layout verification section for verifying the antenna ratio corresponding to the one of the metal wires based on the design standard moderated with the moderation value related to the one of the metal wires.

A program according to still another aspect of the present invention is for causing a computer forming a design apparatus for performing design of a layout in a semiconductor integrated circuit device including electrodes each disposed over a substrate via an insulating film, metal wires in an outermost surface coupled to the electrodes, and diffusion layer regions in the substrate coupled to the metal wires to execute as follows: extracting, based on layout data of the semiconductor integrated circuit device, components from which the two or more independent metal wires are coupled to one of the diffusion layer regions; determining an area of each of the two or more independent metal wires and an area of each of the electrodes coupled to the respective metal wires; determining an antenna ratio between the area of each of the metal wires and the area of the electrode coupled to the metal wire; determining a moderation value for moderating a design standard associated with plasma charge damage related to one of the metal wires based on a ratio of a total area of all the metal wires coupled to the one of the diffusion layer regions to an area of the one of the metal wires; and verifying the antenna ratio corresponding to the one of the metal wires based on the design standard moderated with the moderation value related to the one of the metal wires.

A semiconductor integrated circuit device according to yet another aspect of the present invention includes, as a plurality of test elements: electrodes each disposed over a substrate via an insulating film; metal wires in an outermost surface coupled to the electrodes; and diffusion layer regions in the substrate coupled to the metal wires, wherein each of the test elements is configured such that the two or more independent metal wires are coupled to one of the diffusion layer regions.

According to the present invention, layout of the semiconductor integrated circuit device is performed so as to satisfy the design standard associated with the antenna ratio that has been moderated using the diffusion layer region, and the area of the semiconductor integrated circuit device can be reduced.

DETAILED DESCRIPTION OF THE PREFERRED EMBODIMENTS

A design apparatus according to an embodiment of the present invention is a design apparatus for performing design of a layout in a semiconductor integrated circuit device including electrodes each disposed over a substrate via an insulating film, metal wires in an outermost surface coupled to the electrodes, and diffusion layer regions in the substrate coupled to the metal wires, the design apparatus including a layout data accumulation section (11 of FIG. 1) for holding layout data of the semiconductor integrated circuit device, an antenna ratio calculation section (12 of FIG. 1) for reading the layout data from the layout data accumulation section, extracting, based on the layout data, components from which the two or more independent metal wires are coupled to one of the diffusion layer regions, determining, for each of the components, an area of each of the two or more independent metal wires and an area of each of the electrodes coupled to the respective metal wires, determining an antenna ratio between the area of each of the metal wires and the area of the electrode coupled to the metal wire, and determining a moderation value for moderating a design standard associated with plasma charge damage related to one of the metal wires based on a ratio of a total area of all the metal wires coupled to the one of the diffusion layer regions to an area of one of the metal wires, and a layout verification section (13 of FIG. 1) for verifying the antenna ratio corresponding to the one of the metal wires based on the design standard moderated with the moderation value related to the one of the metal wires.

In the design apparatus, it is preferable that the design standard is verified and, when the design standard is not satisfied, a layout related to the one of the diffusion layer regions is corrected.

In the design apparatus, it is preferable that the moderation value is calculated from a value obtained by multiplying an area of the one of the diffusion layer regions by the ratio of the total area.

In the design apparatus, each of the diffusion layer regions may function as a resistive element.

In the design apparatus, each of the diffusion layer regions may function as wiring.

With a design apparatus as described above, layout of the semiconductor integrated circuit device is performed so as to satisfy the design standard associated with the antenna ratio that has been moderated using the diffusion layer region, and the area of the semiconductor integrated circuit device can be reduced.

Note that that a design apparatus as described above may be formed of a computer such as a personal computer or an engineering workstation, and the computer may be caused to execute a program to allow the antenna ratio calculation section and the layout verification section to function.

Referring to the drawings, the present invention will be described below in detail in accordance with the embodiments thereof.

First Embodiment

Figure 1:
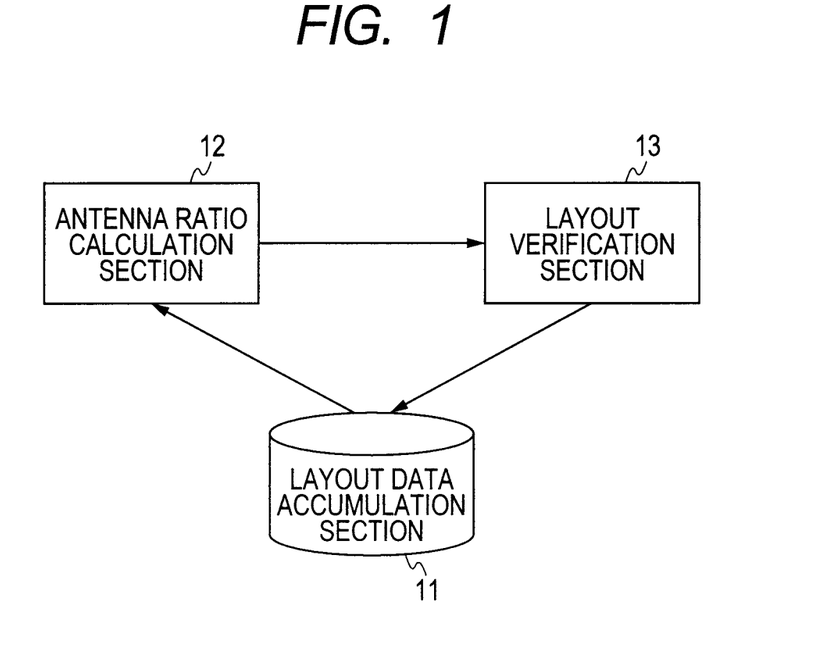
FIG. 1 is a view showing a configuration of a design apparatus according to a first embodiment of the present invention.

FIG. 1 is a view showing a configuration of a design apparatus according to a first embodiment of the present invention. In FIG. 1, the design apparatus includes a layout data accumulation section 11, an antenna ratio calculation section 12, and a layout verification section 13. The layout data accumulation section 11 holds in advance layout data of a semiconductor integrated circuit device as a design target, and further holds layout data as the result of verification performed in the layout verification section 13. The antenna ratio calculation section 12 reads the layout data from the layout data accumulation section 11, extracts components from which two or more independent metal wires are coupled to one of diffusion layer regions based on the layout data, determines, for each of the components, the area of each of the two or more independent metal wires and the area of each of electrodes coupled to the respective metal wires, determines an antenna ratio between the area of each of the metal wires and the area of the electrode coupled to the metal wire, and determines a moderation value for moderating a design standard associated with plasma charge damage related to one of the metal wires based on the ratio of the total area of all the metal wires coupled to the one of the diffusion layer regions to the area of the one of the metal wires. The layout verification section 13 verifies the antenna ratio corresponding to the one of the metal wires based on the design standard moderated with the moderation value related to the one of the metal wires.

Note that, here, the electrodes are not limited to the gate electrodes of transistors, and may also be electrodes of capacitive elements or the like. It will be appreciated that the present invention is applicable to wiring coupled to an electrode of, e.g., a polysilicon-polysilicon capacitive element, a polysilicon-metal capacitive element, or the like.

Hereinbelow, with regard to the design apparatus, a description will be given only of the function of performing layout verification associated with an antenna effect reduction resulting from the diffusion layer region. In general, the design apparatus also includes various functions associated with another design. However, the functions associated with another design are not mentioned herein since they are not related to the present invention.

Figure 2:
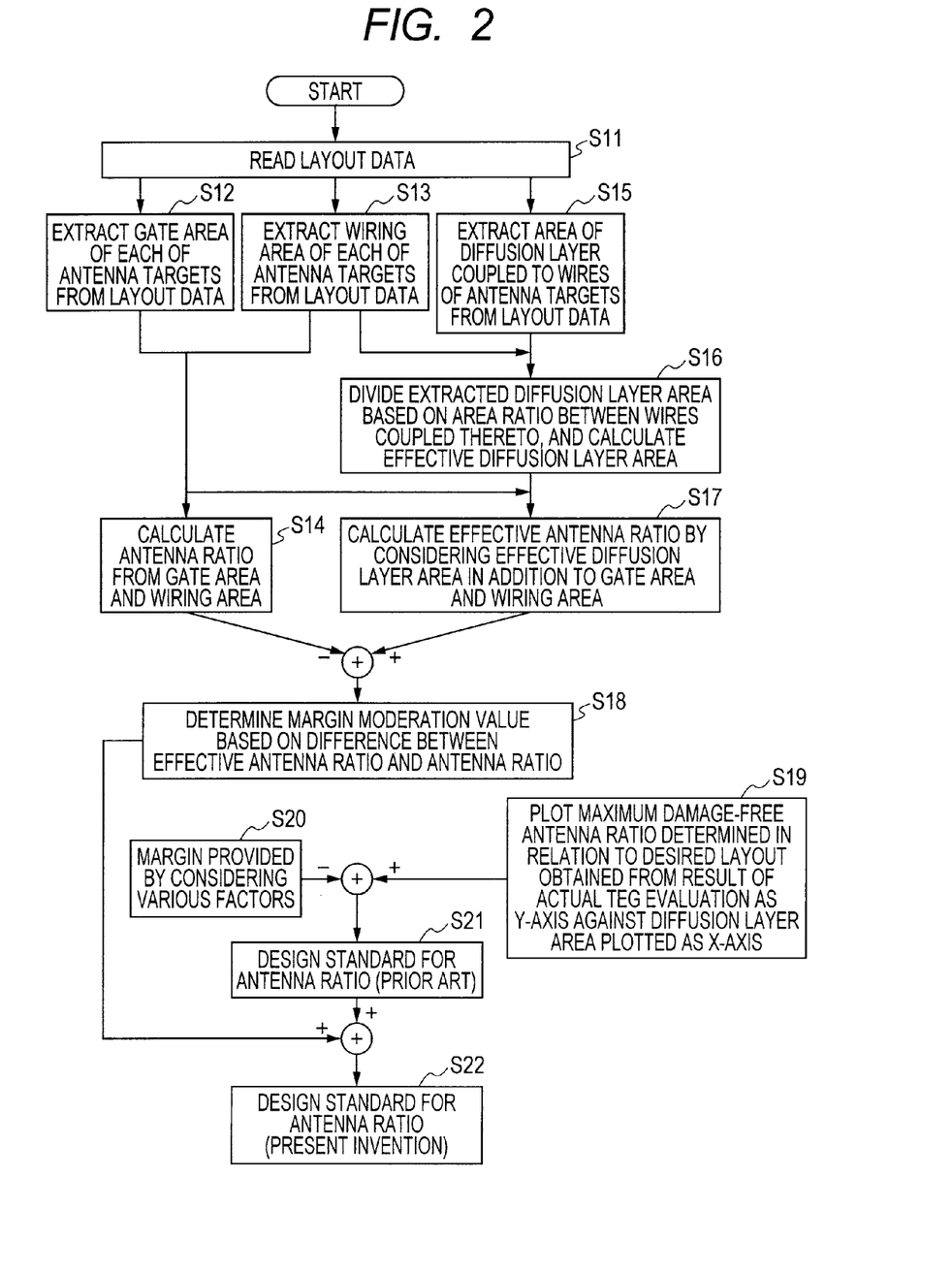
FIG. 2 is a flow chart showing an operation of the design apparatus according to the first embodiment.

Next, a description will be given of an operation in the design apparatus. FIG. 2 is a flow chart showing an operation of the design apparatus according to the first embodiment. In FIG. 2, the design apparatus performs layout design in a semiconductor integrated circuit device including electrodes each disposed over a substrate via an insulating film, metal wires in an outermost surface coupled to the electrodes, and diffusion layer regions in the substrate coupled to the metal wires, especially layout verification associated with an antenna effect reduction.

In Step S11, an antenna ratio calculation section 12 reads the layout data held in advance from the layout data accumulation section 11. From the read layout data, components from which two or more independent metal wires are coupled to one of the diffusion layer regions are extracted, and each of the components is assumed to be a design target serving as an antenna target.

In Step S12, the antenna ratio calculation section 12 determines, for each of the components, the area (gate area) of each of the respective electrodes coupled to the two or more independent metal wires.

In Step S13, the antenna ratio calculation section 12 extracts, from the layout data, the area (wiring area) of each of the metal wires coupled to the target gates.

In Step S14, the antenna ratio calculation section 12 calculates the antenna ratio from the gate area and the wiring area.

In Step S15, the antenna ratio calculation section 12 calculates an area (diffusion layer area) of the diffusion layer region coupled to each of the wires as the antenna targets.

In Step S16, the extracted diffusion layer area is divided based on the area ratio between the wires coupled to the diffusion layer. For example, the area of the diffusion layer region is divided according to the proportions of the individual wiring areas so that an effective diffusion layer area for each of the metal wires as the antenna targets is extracted.

In Step S17, the antenna ratio calculation section 12 calculates an effective antenna ratio by considering the effective diffusion layer area in addition to the gate area and the wiring area.

In Step S18, the layout verification section 13 determines a margin moderation value from the difference between the effective antenna ratio calculated in Step S17 and the antenna ratio calculated in Step S14.

On the other hand, in Step S19, a maximum damage-free antenna ratio determined in relation to a desired layout obtained from the result of actual TEG evaluation is plotted as the Y-axis against the diffusion layer area plotted as the X-axis, as will be described later.

In Step S21, the layout verification section 13 subtracts a margin (Step S20) provided by considering various factors from the standard (straight line over each of the X- and Y-axes) plotted in Step S19 to determine a design standard for a conventional equivalent antenna ratio.

In Step S22, the layout verification section 13 adds the margin moderation value determined in Step S18 to the design standard for the antenna ratios determined in Step S21 to determine a design standard (moderated design standard) for the antenna ratio in the present invention.

Each of processing steps as described above may also be performed by causing a computer forming the design apparatus to execute a program. Such a design apparatus, a design method, and a program allow layout of the semiconductor integrated circuit device to be performed so as to satisfy the design standard (moderated design standard) associated with the antenna ratio that has been moderated using the diffusion layer region. As a result, the semiconductor integrated circuit device in which sufficient consideration has been given to the influence of charge-up is designed.

Next, a description will be given of a reference value in the design standard. Here, for ease of explanation, an exemplary case will be described where two independent metal wires are coupled to one of diffusion layer regions.

Figure 3:
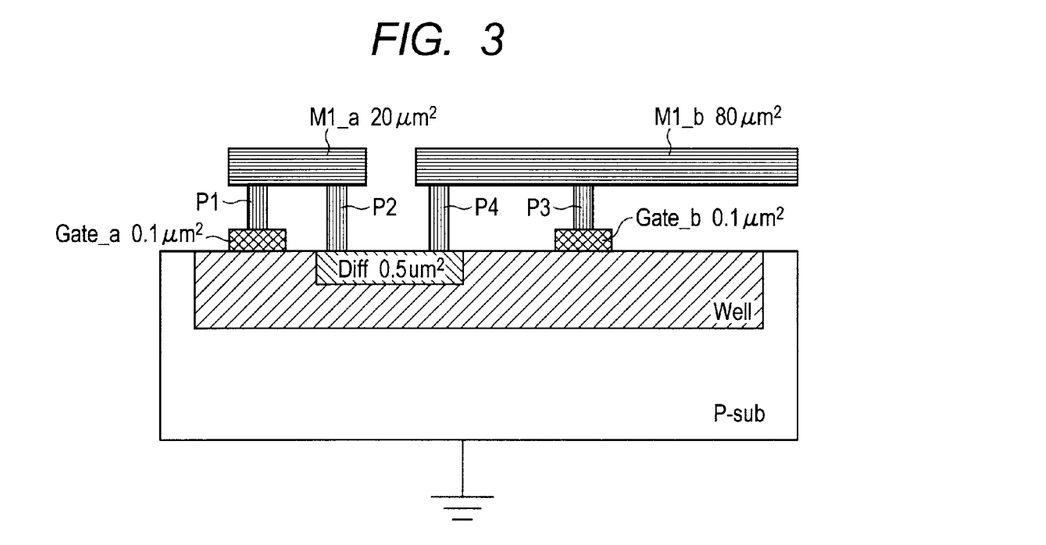
FIG. 3 is a view schematically showing a cross section of a semiconductor integrated circuit device according to the first embodiment.

FIG. 3 is a view schematically showing a cross section of the semiconductor integrated circuit device of the present embodiment. In FIG. 3, in the semiconductor integrated circuit device, a well Well is formed over a P-type substrate P-sub, and a diffusion layer Diff is further formed in the well Well. Over the well Well, gate electrodes Gate_a and Gate_b are formed. The gate electrode Gate_a is coupled to a metal wire M1_a via a contact plug P1. The metal wire M1_a is coupled to the diffusion layer Diff via a contact plug P2. The gate electrode Gate_b is coupled to a metal wire M1_b via a contact plug P3. The metal wire M1_b is coupled to the diffusion layer Diff via a contact plug P4.

Here, the respective areas of the diffusion layer Diff, the gate electrodes Gate_a and Gate_b, and the metal wires M1_a and M1_b are assumed to be 0.5, 0.1, 0.1, 20, and 80 $\mu m^2$.

Note that, when the well Well is an N-well and the diffusion layer Diff is an N-type diffusion layer, the well Well and the diffusion layer Diff function as a substrate contact for a power supply. On the other hand, when the well Well is a P-well and the diffusion layer Diff is a P-type diffusion layer, the well Well and the diffusion layer Diff function as a substrate contact for grounding. Otherwise, when the well Well is an N-well and the diffusion layer Diff is a P-type diffusion layer or when the well Well is a P-well and the diffusion layer Diff is an N-type diffusion layer, the well Well and the diffusion layer Diff function as diodes.

Figure 4:
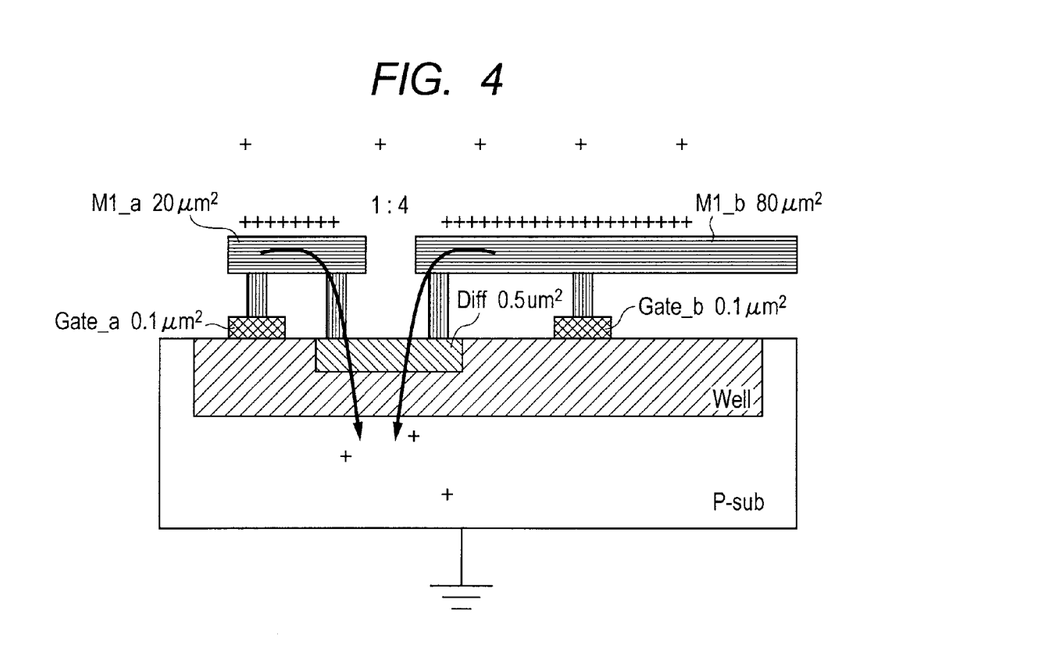
FIG. 4 is a view schematically showing a situation during charge-up in the semiconductor integrated circuit device according to the first embodiment.

When the semiconductor integrated circuit device having a configuration as described above is subjected to a manufacturing process, each of the metal wires M1_a and M1_b is exposed to a plasma to be charged up (undergo charging) by the antenna effect. FIG. 4 is a view schematically showing a situation during the charge-up of the semiconductor integrated circuit device according to the present embodiment. In FIG. 4, the ratio at which the metal wires M1_a and M1_b as uppermost-layer wires are charged by the plasma is determined by the area ratio 20:80=1:4 between the metal wires M1_a and M1_b. Charges resulting from the charge-up are discharged to the P-type substrate P-sub via the diffusion layer Diff and the well Well to reduce the antenna effect. In this case, the effective diffusion layer area that contributes to the moderation of the design standard becomes an area obtained by dividing the diffusion layer area based on the area ratio between the metal wires M1_a and M1_b serving as individual coupled antenna nodes.

That is, antenna ratios A/R_a and A/R_b related to the respective metal wires M1_a and M1_b and the effective diffusion area are as follows.

In relation to the metal wire M1_a, A/R_a=M1_a/Gate_a=20 $\mu m^2$/0.1 $\mu m^2$=200 is satisfied, and the effective diffusion layer area is 0.1 $\mu m^2$.

In relation to the metal wire M1_b, A/R_b=M1_b/Gate_b=80 $m^2$/0.1 $\mu m^2$=800 is satisfied, and the effective diffusion layer area is 0.4 $\mu m^2$.

Figure 5A:
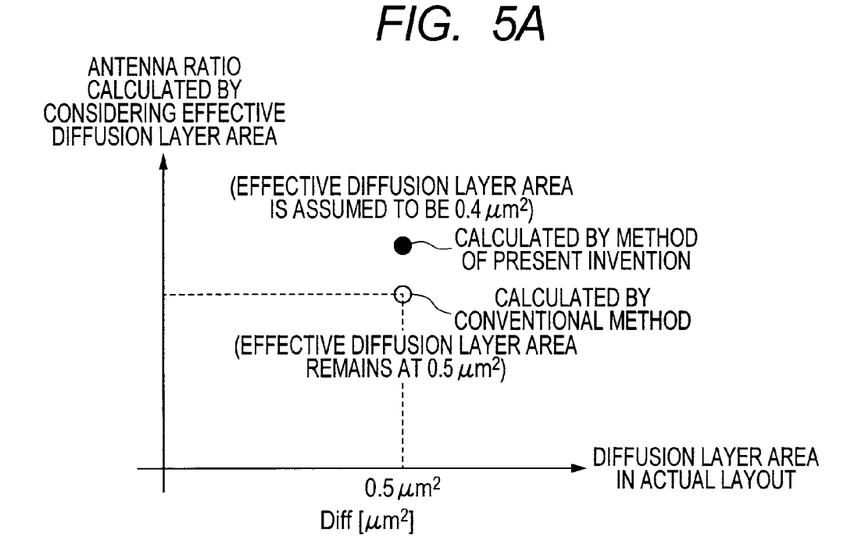
FIGS. 5A and 5B are views illustrating a design standard for the design apparatus according to the first embodiment.

According to the prior art technology, with regard to a semiconductor integrated circuit device having a configuration in which two or more independent metal wires are coupled to one of diffusion layers, design is performed such that, e.g., A/R_c=M1_c/Gate_b=80 $\mu m^2$/0.1 $\mu m^2$=800 is satisfied, and the effective diffusion layer area is 0.5 $\mu m^2$, as indicated by the mark ○ of FIG. 5A. Since accuracy is insufficient to calculate the antenna ratio, a design standard is determined (the dash-dot line L1 of FIG. 5B) by setting a relatively large margin (excessive margin) for the result of actual TEG evaluation (the broken line L0 of FIG. 5B).

Figure 5B:
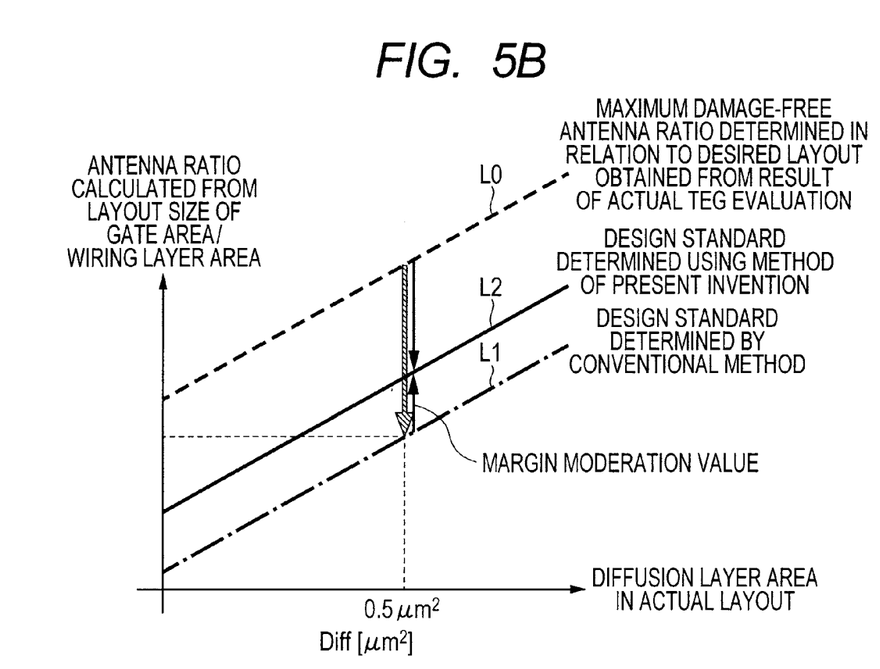

By contrast, in the design method of the present invention, design is performed based on the effective diffusion layer area (the mark • of FIG. 5A: 0.4 $\mu m^2$) obtained by dividing the diffusion layer area based on the ratio between the areas of the individual metal wires. That is, a design standard (the solid line L2) is set by adding the margin moderation value to the conventional design standard L1, as shown in FIG. 5B. This allows the antenna ratio to be more precisely calculated (to have a stricter value), and allows a design standard to be determined by setting an inexcessive and proper margin for the result L0 of actual TEG evaluation. Note that the broken line L0 of FIG. 5B is determined correspondingly to an evaluation result from a semiconductor integrated circuit device for verification which includes a test element group (TEG) described in a second embodiment of the present invention.

Next, a description will be given of a layout method for layout data as a design target based on the design standard (moderated design standard) determined as described above.

Figure 6:
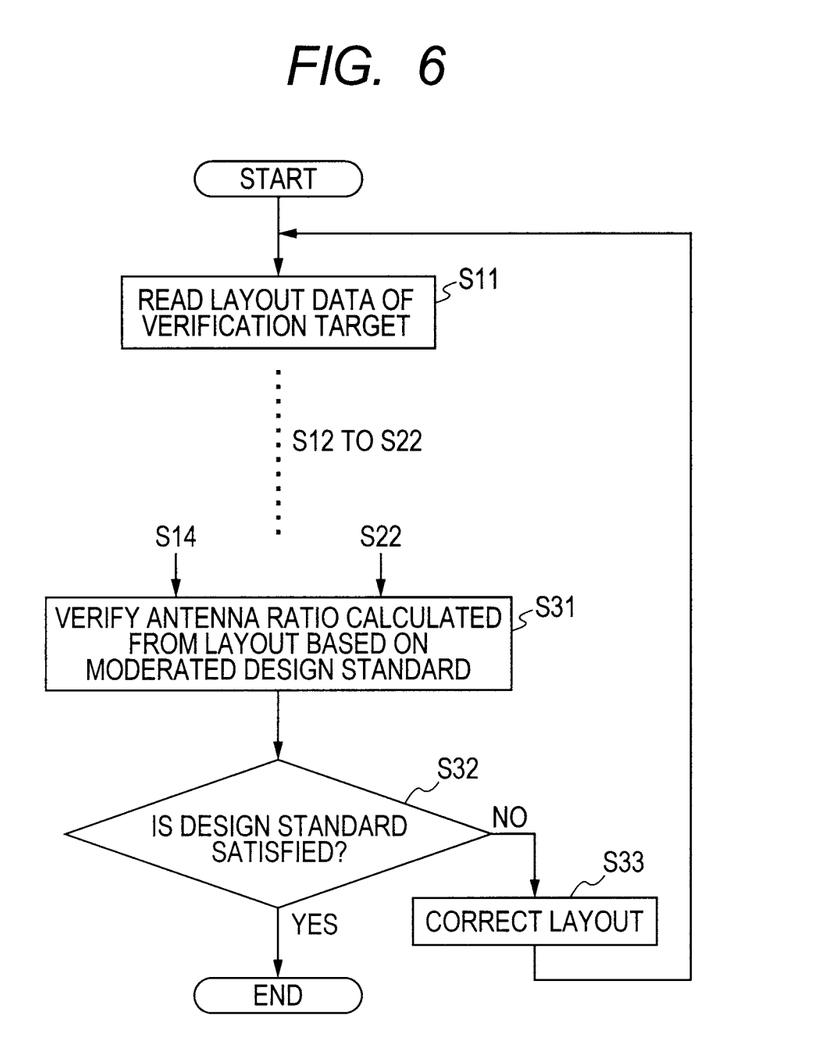
FIG. 6 is a flow chart showing a layout method using the design apparatus according to the first embodiment.

FIG. 6 is a flow chart showing a layout method using the design apparatus according to the first embodiment. In FIG. 6, in Steps S11 to S22, the same processing steps as shown in FIG. 2 are performed.

In Step S31, the layout verification section 13 verifies the antenna ratio calculated in Step S14 based on the moderated design standard determined in Step S22.

In Step S32, the layout verification section 13 checks whether or not the calculated antenna ratio satisfies a reference value serving as the moderated design standard. If the reference value is satisfied (Y in Step S32), the layout verification section 13 ends the verification of a layout in a target component. On the other hand, if the reference value is not satisfied (N in Step S32), the layout verification section 13 corrects the layout of the target metal wire, and returns to Step S11.

According to a design method as described above, a conventional excessive margin is reduced, and design is performed based on the moderated design standard having a proper margin. Therefore, it is possible to reduce the number of layouts to which essentially unnecessary modifications have been made, such as the insertion of a repeater cell or a diode cell in the wiring, the adjustment of the size of a transistor to achieve a gate area of not less than a predetermined value, and the use of a cell to which a new transistor is added, and reduce the area of the semiconductor integrated circuit device.

Second Embodiment

A semiconductor integrated circuit device of the second embodiment is the semiconductor integrated circuit device for verification which includes the test element group (TEG) for the evaluation of a process characteristic. Each of test elements is configured such that two or more independent metal wires are coupled to one of diffusion layer regions, and a gate electrode is coupled to each of the metal wires.

Figure 7:
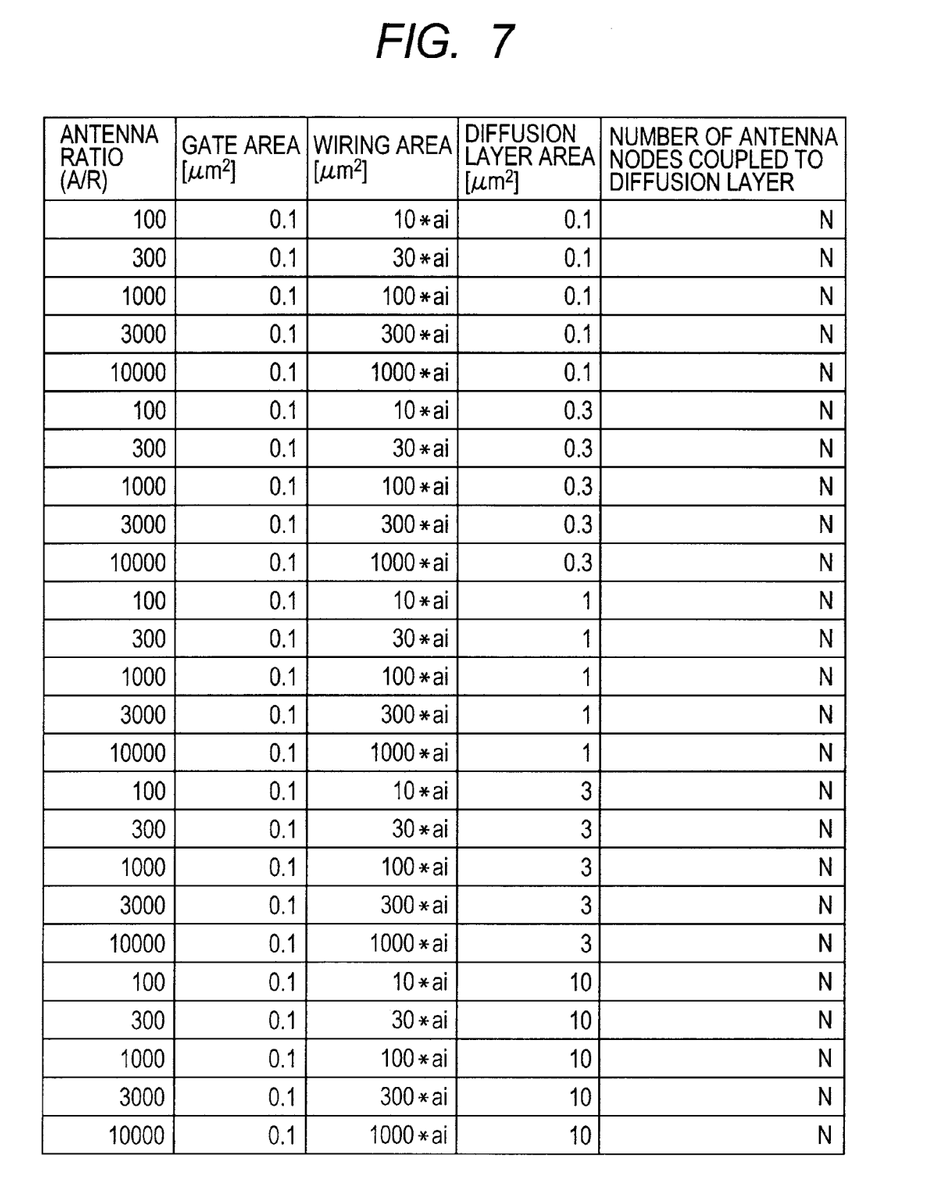
FIG. 7 is a view showing an example of a configuration of a test element group mounted in a semiconductor integrated circuit device according to a second embodiment of the present invention.

FIG. 7 is a view showing an example of a configuration of the test element group mounted in the semiconductor integrated circuit device according to the second embodiment. For example, in the test element corresponding to the uppermost row in FIG. 7, independent N (N is an integer of not less than 2) metal wires (antenna nodes) are coupled to a diffusion layer region having an area of 0.1 $\mu m^2$, and a gate electrode having an area of 0.1 $\mu m^2$ is coupled to each of the metal wires. The area of each of the N metal wires is $10*a_i$ $\mu m^2$. Here, $$a_i = i \bigg/ \sum_{i=1}^{N} i$$

is satisfied. For example, when N=3 is satisfied, the respective areas of the three metal wires are $10*1/6$ $\mu m^2$, $10*2/6$ $\mu m^2$, and $10*3/6$ $\mu m^2$. The total area of the N metal wires is $10$ $\mu m^2$. Accordingly, the antenna ratio (A/R) is 10/0.1=100. Note that the antenna ratio of FIG. 7 is shown as "Total Area of N Metal Wires/Area of Gate Electrode".

A test element group having combinations of antenna ratios, areas of diffusion layer regions, and the number N of metal wires as shown in FIG. 7 is set in a range up to the upper limit of combinations appearing in a semiconductor integrated circuit device as an actual manufacturing target. The conductivity types of a well and a diffusion layer are prepared in combinations of P-type and N-type as described in the first embodiment. The test element group in the combinations thus prepared is mounted in the semiconductor integrated circuit device for verification. Then, the semiconductor integrated circuit device for verification is subjected to the manufacturing steps, and damage caused to gate oxide films by charge-up resulting from the antenna effect is inspected.

By verifying in which row of combination intolerable damage has occurred for the semiconductor integrated circuit device for verification thus manufactured, it is possible to verify a design standard in the semiconductor integrated circuit device as a manufacturing target. Note that the combinations shown in FIG. 7 are exemplary, and individual numerical values should be set in accordance with the specifications of a semiconductor integrated circuit device as a manufacturing target, a situation in the manufacturing steps of the semiconductor integrated circuit device, or the like.

Note that the disclosure of each of Patent Documents described above or the like is incorporated herein by reference in its entirety. Within the scope of the entire disclosure (including claims) of the present invention, and further based on the basic technical idea thereof, it is possible to perform change/adjustment of the embodiments and examples thereof. In addition, within the scope of claims of the present invention, it is possible to make a various combination or selection of a variety of disclosed elements. That is, it will be appreciated that the present invention includes various modifications and alterations that could be made by those skilled in the art according to the entire disclosure including claims and the technical idea.

What is claimed is:

1. A design method being performed by a design apparatus for designing a layout in a semiconductor integrated circuit device comprising electrodes each disposed over a substrate via an insulating film, metal wires in an outermost surface coupled to the electrodes, and diffusion layer regions in the substrate coupled to the metal wires, the design method comprising steps of:

extracting, based on layout data of the semiconductor integrated circuit device, components from which two or more of the metal wires are separate and independently coupled to one of the diffusion layer regions;

determining an area of each of the two or more of the metal wires and an area of each of the electrodes coupled to said each of the two or more of the metal wires, respectively;

determining an antenna ratio between the area of each of the metal wires and the area of an associated electrode coupled to said each of the metal wires;

determining a moderation value for moderating a design standard associated with plasma charge damage related to one of the metal wires based on a ratio of a total area of all the metal wires coupled to the one of the diffusion layer regions to an area of the one of the metal wires; and verifying the antenna ratio corresponding to the one of the metal wires based on the design standard moderated with the moderation value related to the one of the metal wires.

2. A design method according to claim 1, further comprising a step of:

verifying the design standard and, when the design standard is not satisfied, correcting a layout related to the one of the diffusion layer regions.

3. A design method according to claim 1, wherein the moderation value related to one of the metal wires is calculated from a value obtained by multiplying an area of the one of the diffusion layer regions by the ratio of the total area of all the metal wires coupled to said one of the diffusion layer regions to the area of the one of the metal wires.

4. A design method according to claim 1,
wherein each of the diffusion layer regions functions as a resistive element.

5. A design method according to claim 1,
wherein each of the diffusion layer regions functions as a wiring.

6. A design apparatus for performing design of a layout in a semiconductor integrated circuit device comprising electrodes each disposed over a substrate via an insulating film, metal wires in an outermost surface coupled to the electrodes, and diffusion layer regions in the substrate coupled to the metal wires, the design apparatus comprising:
a layout data accumulation section for holding layout data of the semiconductor integrated circuit device;
an antenna ratio calculation section for reading the layout data from the layout data accumulation section, extracting, based on the layout data, components from which two or more of the metal wires are separate and independently coupled to one of the diffusion layer regions, determining, for each of the components, an area of each of the two or more of the metal wires and an area of each of the electrodes coupled to the said each of the two or more of the metal wires, respectively, determining an antenna ratio between the area of each of the metal wires and the area of an associated electrode coupled to said each of the metal wires, and determining a moderation value for moderating a design standard associated with plasma charge damage related to one of the metal wires based on a ratio of a total area of all the metal wires coupled to the one of the diffusion layer regions to an area of the one of the metal wires; and
a layout verification section for verifying the antenna ratio corresponding to the one of the metal wires based on the design standard moderated with the moderation value related to the one of the metal wires.

7. A design apparatus according to claim 6,
wherein the design standard is verified and, when the design standard is not satisfied, a layout related to the one of the diffusion layer regions is corrected.

8. A design apparatus according to claim 6,
wherein the moderation value related to one of the metal wires is calculated from a value obtained by multiplying an area of the one of the diffusion layer regions by the ratio of the total area of all the metal wires coupled to the one of the diffusion layer regions to the area of the one of the metal wires.

9. A design apparatus according to claim 6,
wherein each of the diffusion layer regions functions as a resistive element.

10. A design apparatus according to claim 6,
wherein each of the diffusion layer regions functions as a wiring.

11. A non-transitory computer-readable medium storing a program for causing a computer forming a design apparatus for performing a design of a layout in a semiconductor integrated circuit device comprising electrodes each disposed over a substrate via an insulating film, metal wires in an outermost surface coupled to the electrodes, and diffusion layer regions in the substrate coupled to the metal wires to execute steps of:
extracting, based on layout data of the semiconductor integrated circuit device, components from which the two or more of the metal wires are separate and independently coupled to one of the diffusion layer regions;
determining an area of each of the two or more of the metal wires and an area of each of the electrodes coupled to said each of the two or more of the metal wires, respectively;
determining an antenna ratio between the area of each of the metal wires and the area of an associated electrode coupled to said each of the metal wires;
determining a moderation value for moderating a design standard associated with plasma charge damage related to one of the metal wires based on a ratio of a total area of all the metal wires coupled to the one of the diffusion layer regions to an area of the one of the metal wires; and
verifying the antenna ratio corresponding to the one of the metal wires based on the design standard moderated with the moderation value related to the one of the metal wires.

12. A program according to claim 11,
wherein the program causes the computer to further execute a step of:
verifying the design standard and, when the design standard is not satisfied, correcting a layout related to the one of the diffusion layer regions.

13. A program according to claim 11,
wherein the moderation value related to one of the metal wires is calculated from a value obtained by multiplying an area of the one of the diffusion layer regions by the ratio of the total area of all the metal wires coupled to said one of the diffusion layer regions to the area of the one of the metal wires.

14. A semiconductor integrated circuit device functioning as a plurality of test elements, comprising:
electrodes each disposed over a substrate via an insulating film;
metal wires in an outermost surface coupled to the electrodes; and
diffusion layer regions in the substrate coupled to the metal wires,
wherein each of the test elements is configured such that two or more of the metal wires are separate and independently coupled to one of the diffusion layer regions.

15. A semiconductor integrated circuit device according to claim 14,
wherein the two or more of the metal wires have respective areas different from each other.

16. A semiconductor integrated circuit device according to claim 14,
wherein the test elements include a group of the test elements which are different in a total area of all the metal wires coupled to the one of the diffusion layer regions.

17. A semiconductor integrated circuit device according to claim 14,
wherein the test elements include a group of the test elements which are different in a ratio between an area of the one of the diffusion layer regions and a total area of all the metal wires coupled to the one of the diffusion layer regions.

18. A semiconductor integrated circuit device according to claim 14,
wherein each of the diffusion layer regions is formed in the substrate via a well, and wherein the diffusion layer region and the well are of the same conductivity type or different conductivity types.

* * * * *